Figure 1:
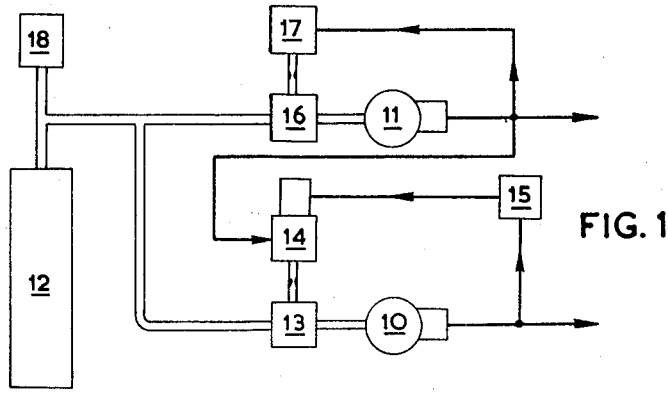

Sept. 8, 1959 G. J. MUIRHEAD 2,903,600
CONTROL OF FLUID DRIVEN POWER SUPPLY SYSTEMS
Filed Feb. 28, 1957 2 Sheets-Sheet 1

Inventor
George John Muirhead
By:
Stevens, Davis, Miller & Mosher
Attorneys

United States Patent Office 2,903,600
Patented Sept. 8, 1959

2,903,600

CONTROL OF FLUID DRIVEN POWER SUPPLY SYSTEMS

George John Muirhead, Hitchin, England, assignor to The English Electric Company Limited, London, England, a British company Application February 28, 1957, Serial No. 643,125

Claims priority, application Great Britain March 8, 1956

9 Claims. (Cl. 290—40)

This invention relates to fluid driven power supply systems.

According to the invention, a fluid driven power supply system comprises fluid supply means, a fluid driven prime mover, power producing means driven by said prime mover, a fluid control valve connected to control the fluid supplied to the prime mover by said fluid supply means, a highly powered actuation mechanism for said fluid control valve operative to exert a force on the valve to close the valve against the pressure action of the fluid supply so that when the valve is closed the pressure of the fluid supply tends to force it open, and automatic valve control means operative to control the actuation mechanism to fully open and fully close the valve alternately during normal steady state operation of the prime mover so as to cause fluid to be supplied to the prime mover intermittently.

According to a feature of the invention, said power producing means comprise an electric alternator connected to be driven by the prime mover, said highly powered actuation mechanism is an electrically controlled hydraulic actuator connected to be energized by hydraulic power supply means, and said automatic valve control means comprise an electrical circuit which controls the hydraulic actuator, said electrical circuit being responsive to a parameter of the electrical power output from the alternator and operative to fully open said valve when this parameter decreases below a first controlled value and to fully close said valve when the parameter increases above a second controlled value, the first controlled value being smaller than the second controlled value, and the magnitude and difference between these values respectively serving to determine the controlled level of the parameter of the power output from the alternator and the frequency of the intermittent on-off operation of the valve.

According to a further feature of the invention, the power supply system comprises independent control means for supplying a D.C. control signal, and said electrical circuit operates to control the voltage output from the alternator and comprises rectifier means for rectifying a signal proportional to this voltage and relay means responsive to the difference between said D.C. control signal and the rectified signal supplied by said rectifier means and operative in conjunction with the load on the alternator to govern the frequency of the intermittent valve operation by virtue of its different pick-up and drop-out energization levels.

According to a still further feature of the invention, said relay has an operating coil energized from the output from said rectifier means in dependence upon an output control from an amplifier which forms part of said circuit and which responds to the difference between said D.C. control signal and the rectified signal supplied by said rectifier means.

According to another feature of the invention, the power supply system is driven by hot elastic fluid and said highly powered actuation mechanism is a hydraulically operated actuator connected to hydraulic power supply means, said fluid control valve and its hydraulic actuator being attached to one another to form a single assembly but have separate bodies which are spaced from one another to prevent undue heat transfer from the valve to the actuator.

According to a further feature of the invention, in the system the body of the actuator and the body of the valve are attached to one another by slender rigid support members and the valve closing movement is communicated from the actuator to the valve by a ram which is hydraulically operated by the actuator and has a curved end-face which seats on a valve member of the fluid control valve to provide point contact and a low heat conducting connection.

According to yet another feature of the invention, a fluid driven power supply system comprises fluid supply means, a fluid driven prime mover, power producing means driven by said prime mover, a fluid control valve connected to control the fluid supplied to the prime mover by said fluid supply means, a highly powered actuation mechanism for said fluid control valve operative to exert a force on the valve to close the valve against the pressure action of the fluid supply so that when the valve is closed the pressure of the fluid supply tends to force it open, said actuation mechanism being energized by and in direct proportion to the power produced by said power producing means and comprising part of an automatic valve control means operative to fully open and fully close the valve alternately during normal steady state operation of the prime mover so as to cause fluid to be supplied to the prime mover intermittently.

According to a further feature of the invention, said system comprises, in combination, two fluid driven prime movers controlled by independent hydraulically actuated fluid control valves connected to the said fluid supply means, and at least one of the valves being controlled electrically, a hydraulic pump adapted to be driven by one of said prime movers, an electrical alternator adapted to be driven by the other of said prime movers, and said pump and said alternator being adapted respectively to supply the hydraulic power and the electrical power required to actuate and control the valves.

According to still another feature of the invention, a fluid driven power supply system comprises fluid supply means, a fluid driven prime mover, power producing means driven by said prime mover, a pipe connection between said fluid supply means and said prime mover, a fluid control valve connected in said pipe connection intermediate its ends so as to control the fluid supply to the prime by said fluid supply means, a highly powered actuation mechanism for said fluid control valve operative to exert a force on the valve to close the valve against the pressure action of the fluid supply so that when the valve is closed the pressure of the fluid supply tends to force it open, and automatic valve control means operative to control the actuation mechanism to fully open and fully close the valve alternately during normal steady state operation of the prime mover so as to cause fluid to be supplied to the prime mover intermittently.

Figure 2:
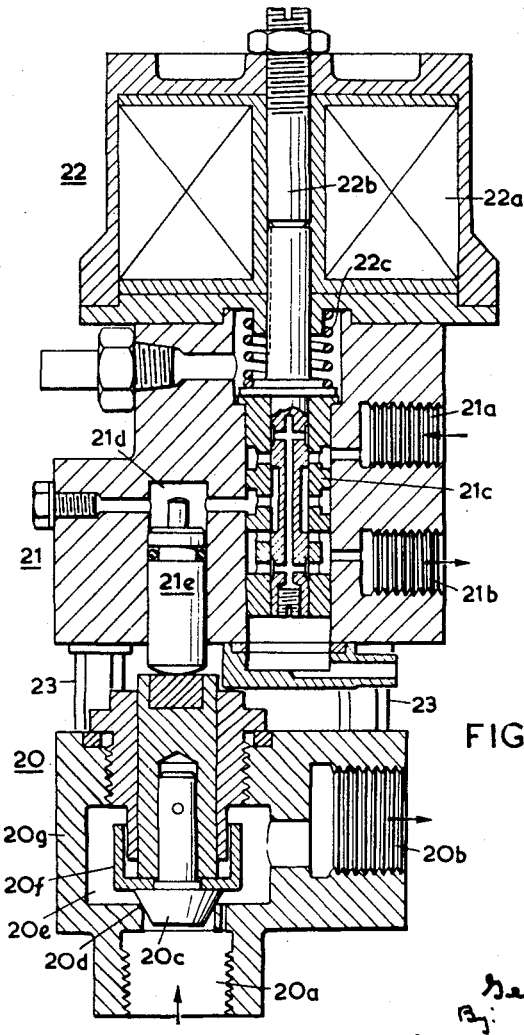
Figure 3:
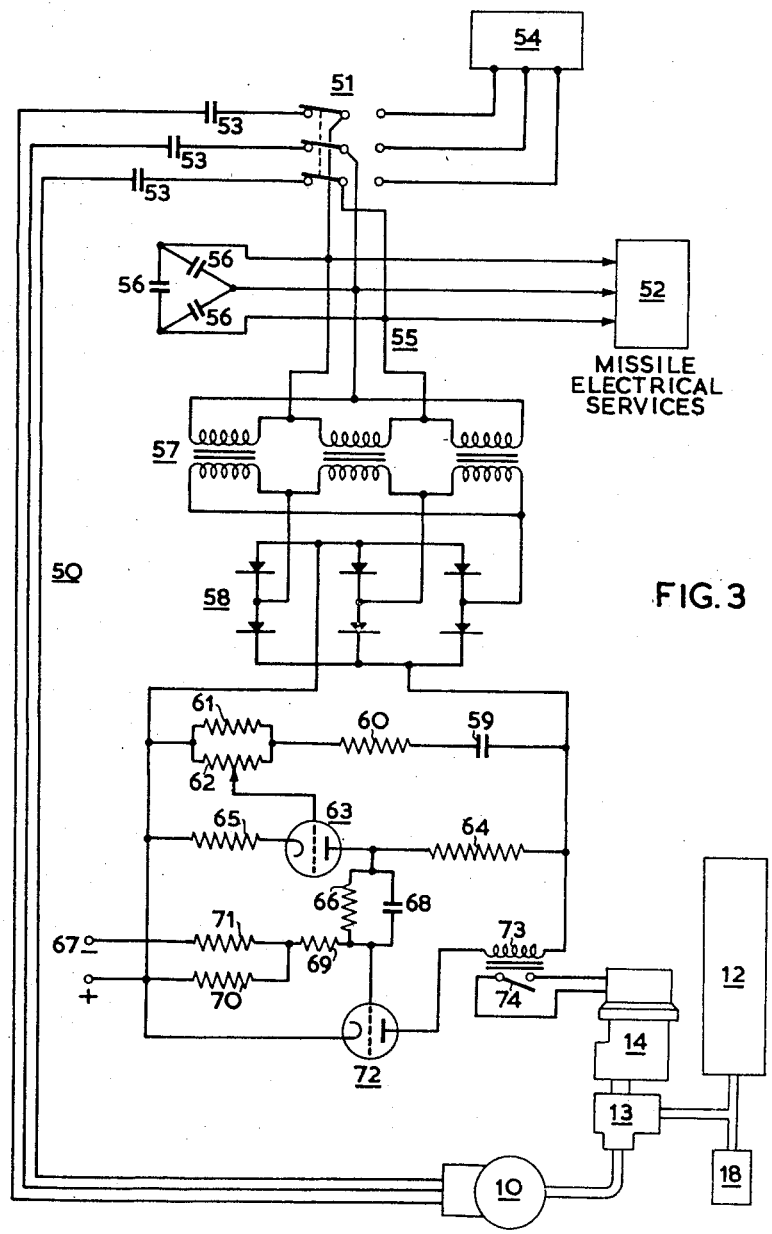

The invention and the subsidiary features of the invention just mentioned will now be described with reference to the accompanying drawings. In the drawings Fig. 1 illustrates a schematic arrangement of an electrical supply system and an oil supply system arranged to be driven by gas produced from a cordite charge, Fig. 2 illustrates a valve assembly used in the system shown in Fig. 1 for controlling the supply of gas to a turbine alternator, and Fig. 3 shows details of an electrical control system which may be used in actuating a valve used in an electrical power supply system incorporating the invention.

Referring to Fig. 1, a turbine alternator 10 and a turbine pump 11 are both arranged to be driven by gas supplied from a cordite charge at 12. The gas supplied to the turbine alternator 10 is under the control of a gas-control valve 13 which is actuated by a hydraulic relay 14 controlled electrically by the output from an amplifier 15. The amplifier 15 is in turn controlled in accordance with the output from the turbine alternator 10. The hydraulic relay 14 is energized from the output of the turbine pump 11. This turbine pump 11 is controlled by the gas-control valve 16 which is operated by the hydraulic actuator 17 also energized by the output from the turbine pump 11. A relief valve 18 is provided for limiting pressure in the supply lines between the cordite charge and the valves 13 and 16.

To perform control functions in a guided missile it is found necessary to have an electrical power supply and a hydraulic power supply and it is convenient to utilise a solid gas-producing charge such as cordite as the source of energy of these supplies. It is, however, desirable to maintain the electrical power output and hydraulic power output of the supplies constant or within certain limits and a simple way of doing this is to control the rate of supply of gas from the charge to a prime mover, e.g. a turbine. Trouble has been experienced in using a continuously controlled valve for this purpose. This trouble arises in part from the very high temperature of the gas used and the fact that solid particles are carried by the gas. These may be remedied by incorporating a filter in the gas supply system and cooling the gas but in missile applications this latter remedy is not practicable and a filter of sufficient capacity is heavy and adversely affects the efficiency of the system.

It has been found, however, that if the valves controlling the supply of gas to the turbines are designed to operate with an on-off action the design of a valve which can work at high temperatures and with particle containing gases is feasible. With such a design the valve would normally be much larger than would be required if a continuously variable adjustment of the valve were used to control the gas supply. Since with such an operation the turbine receives its gas supply intermittently the frequency of the system must be fairly high. A smoothing of the power output may be obtained partly as a result of the inertia of the rotating part of the turbine and partly, in the case of an electrical supply, by electrical smoothing means or, in the case of a hydraulic supply by the provision of hydraulic accumulators in the output line. A stabilization of the power outputs from the system may be obtained by controlling the on-off action of the gas-control valves in accordance with the actual power output. For example, the valve may be closed when the power output has reached a predetermined value and it may be opened when the power output has fallen to a certain predetermined value. This latter predetermined value must, of course, be less than the first mentioned predetermined value. In an electrical circuit to be described with reference to Fig. 3 these values are determined by the characteristics of a relay which picks up and drops out at somewhat different values of energizing current. The frequency of the intermittent operation of the valve is dependent upon the difference between the two predetermined values; the smaller the difference, the higher the frequency and the better the stabilization. To obtain a good degree of stabilization with valve operation at a reasonable frequency an amplifier may be interposed as an input stage to the relay. Such details will be more apparent when Fig. 3 has been described.

In the missile application just considered the rate of production of gas by the gas producing charge must, of course, be sufficient and since if this charge is cordite it is not possible to control this rate once the charge has been ignited, a relief valve is necessary in order to keep the supply pressure within safe limits.

The rapid frequency response necessary for an adequate stabilization of the power output requires that the valve should be operated many times per second. In practice, a frequency of the order of ten cycles per second is suitable. To combat the trouble which arises from the very high temperature of the gas the valve should be a large one. These requirements necessitate a powerful actuator for the valve and it is for this reason that the valves 13 and 16 in the system shown in Fig. 1 are actuated hydraulically. In the case of the valve 13 a hydraulic relay 14 is used, this being controlled electrically in accordance with the output from the amplifier 15. Subsidiary features of the invention will be apparent from a description of an embodiment of a valve assembly which combines the valve 13 and the hydraulic relay 14. This will now be described with reference to Fig. 2.

The valve assembly shown in Fig. 2 comprises essentially a gas-control valve 20, a hydraulic relay 21, and an electrical actuator 22. The valve 20 has an inlet port 20a and an outlet port 20b. The valve action is provided by a conically ended valve member 20c which, in the closed position of the valve, engages a circular valve seating 20d at the inlet end of the port 20a. A collector chamber 20e surrounds the valve member 20c and the port 20b allows the egress of gas from this chamber. A shield 20f protects the sliding surfaces between the valve member 20c and the valve case 20g from solid particles carried in gas flowing through the valve.

The hydraulic relay 21 has an inlet port 21a and an outlet port 21b. A spool valve 21c controls the admission of high pressure oil emitted through the port 21a to a chamber 21d. A piston 21e slides within this chamber and has an end which projects from the relay and engages an exposed end of the valve member 20c. Thus, depending upon the position of the spool valve 21c oil, under pressure, is admitted through the port 21a to the chamber 21d to displace the piston 21e and close the valve 20 against the action of pressure of the gas in the port 20a or, to connect the port 21b to the chamber 21d and allow the gas pressure in the port 20a to force the valve member 20c off its seating so opening the valve 20 and displacing oil from the chamber 21d and expelling it through the port 21b. In this way the position of the spool valve 21c determines whether or not the valve 20 is open.

The force required to operate the spool valve 21c is small relative to that required to operate the valve 20. Thus a small electrical actuator 22 may be used for operating the spool valve 21c. In Fig. 2 this actuator is shown to comprise a solenoid 22a having an armature 22b which is arranged to displace the spool valve 21c against the action of a spring 22c when the solenoid 22a is energised, but which is returned to a neutral position by the action of this spring when the solenoid is de-energised. The arrangement is such that when the solenoid is energised the valve 20 is open.

It is to be noted that although the gas controlled by the valve 20 may have a very high temperature the oil or other hydraulic liquid used by the relay 21 requires to be maintained cool and in view of this the heat transfer between the valve 20 and the relay 21 should be reduced as much as possible. In Fig. 2 the relay and the valve are combined as one assembly but they are spaced apart by slim supports 23. To this end, the piston 21e, which acts as a ram to communicate the valve closing movement from the hydraulic actuator to the valve has a curved end-face which seats on the valve member to provide point contact having a low heat conducting connection.

Referring to Fig. 3, the electrical power supply system of Fig. 1 is reproduced in detail, the full circuit of what has been called the amplifier 15, being shown. As in Fig. 1 the gas control valve and its actuator are denoted 13 and 14 respectively. The turbine alternator 10 supplies a three-phase output along the power supply lines 50 and this output is supplied through a three-phase switch 51 to electrical services denoted generally at 52. Capacitors 53 are included in the output lines 50 and serve to correct the power factor of the circuit. The purpose of the switch 51 is to supply the electrical services at 52 with power from an alternative source 54. This may be necessary where, as in the missile application just considered, the turbine alternator 10 is energised by gas produced from a cordite charge. In such a case the alternator 10 would only be required to produce the electrical power required by the services at 52 when the missile is actually in flight. To conserve the cordite and to make optimum use of the pay load capacity of the missile such electrical power as is required by the services at 52 is best drawn from external sources during a period prior to the launching of the missile. For the purpose of describing the operation of this invention it suffices to regard the switch 51 as having at all times the position shown in the drawing, the output from the alternator 10 being then connected directly to the services at 52. The supply voltage of the electrical power fed to the services at 52 is tapped by a three-phase line 55. Capacitors 56 are connected between the line phases and serve to safeguard against transient disturbances which may, for example, occur during various switching operations in the services at 52. The three-phase signal supplied by the line 55 is fed through an isolating transformer 57 and the output from this transformer is rectified by means of a three-phase bridge rectifier 58. The rectified output signal, which is now a measure of the mean inter-phase voltage of the supply to the services at 52 is passed through a filter which cuts down the ripple on the D.C. voltage. This filter comprises a capacitor 59 and a resistor 60 connected in series with a parallel combination of a fixed resistor 61 and a potentiometer 62 across the output lines from the bridge rectifier 58. A fairly strong D.C. voltage appears across the whole of this filter circuit and a fairly small D.C. voltage appears across a part of the potentiometer 62. This latter voltage is fed, as shown in the drawing, to the grid of a triode valve 63, the anode and cathode circuits comprise resistors 64 and 65 connected respectively to the different output terminals of the bridge rectifier 58. The function of the valve 63 is to assist in the filter action of the filter circuit and to provide an output signal which is not unduly small in comparison with the output signal drawn from the rectifier 58. The output signal from the filter circuit appears between the negative output line from the rectifier 58 and the anode of the valve 63. This signal is fed through a resistor 66 whose output side is connected through resistors to a terminal 67. Capacitor 68 is connected across the resistor 66. The function of this capacitor is to smooth the potential drop across the resistor 66. The voltage appearing on the output side of the resistor 66 is determined both by the voltage output from the rectifier 58 and the potential of the terminal 67 relative to the negative output line of the rectifier. The resistors 69, 70, and 71 together with the resistor 66 determine how the output voltage, which is the voltage on the output side of the resistor 66, depends upon these two quantities. This output voltage is applied between the grid and cathode of a further triode valve 72. The anode circuit of this valve includes a relay operating coil 73. The current through this coil determines the position of relay contacts 74. At two certain values of anode current the relay contacts will open and close respectively. When a large value of current flows through the coil 73 the relay contacts 74 close, and when the current falls below a value somewhat less than this the contacts open. The contacts 74 are connected in a circuit which supplies the solenoid 22a (see Fig. 2) of the actuator 14. The operating power is drawn from the output from the rectifier 58.

In operation, when the contacts 74 are closed the rectifier 58 supplies current to the operating solenoid of the actuator 14. This allows, through the intermediary action of the hydraulic relay supplied by a hydraulic power source not shown in the drawing, the valve 13 to be closed. As a result the turbine alternator 10 will begin to slow down causing the output voltage of the lines 50 to decrease. Consequently there will be a decrease in the output voltage of the rectifier 58. This decrease will be insufficient to promote a direct de-energisation of the operating solenoid of the actuator 14. However, accompanying the fall in the output voltage from the rectifier 58 there will be a corresponding fall in the grid voltage of the valve 72. The effects of this reduction of voltage are accentuated by the amplification function of the valve 72 and, when the alternator output voltage has fallen sufficiently, the current in the operating coil 73 will fall sufficiently to cause the relay contacts 74 to open. This, in turn, will allow the valve 13 to re-open to supply gas to the turbine driving the alternator 10. The operation of the system thus follows a recurring cycle and causes the valve 13 to open and close intermittently at a frequency determined by the characteristics of the system. If the potential of the terminal 67 is maintained constant so as to bias the grid voltage supplied to the valve 72 by the rectifier 58 the system will operate to produce a stabilised output voltage independent of the load of the services at 52. The degree of stabilisation will depend upon the design of the circuit, being determined by the speed of response of the actuator 14 and the valve 13 and also upon the range of current in the coil 73 required to open and close the relay contacts 74. The use of the amplifier comprising the valve 72 assists in the stabilisation of the alternator output voltage in that it causes the relay comprising coil 73 and relay contacts 74 to operate in response to small changes of alternator output voltage. In the system shown a control of the output voltage can be effected by varying the potential of the terminal 67.

Whereas in the above description attention has been restricted to power supply systems driven by gas supplied from a solid gas producing charge, it is to be understood that in its broadest aspect the invention can be used where the prime mover is driven by gas supplied in other ways or even by vapors such as steam. It should, however, be noted that the full advantages of the invention are best realised in a situation in which the prime mover is driven by hot dirty gas.

In the illustration given this gas has been produced from a cordite charge. Once initiated the production of gas from such a charge must continue until the cordite has burnt out. The frequency at which the valve 13 then operates must, therefore, not be too small since the capacity of the gas supply means to store gas under pressure would then have to be very high or much of the gas would have to be wasted through the relief valve. A need for a high operating frequency of the valve 13 therefore exists where the system is driven from an explosive charge, and the use of a hydraulic relay in the valve actuator to speed up the valve operation is therefore desirable besides which the turbine alternator 10 and, in the system shown in Fig. 1, the turbine pump 11, should have as low an inertia as possible to facilitate this high speed operation. In other systems where more usual supplies of gas or steam may be used the operating frequency of the valve 13 may be very low; it may be of the order of one cycle per ten seconds or even smaller provided the inertia of the prime mover system is sufficiently great.

What I claim as my invention and desire to secure by Letters Patent is:

1. A fluid driven power supply system comprising fluid supply means, a fluid driven prime mover, power producing means driven by said prime mover, a fluid control valve connected to control the fluid supplied to the prime mover by said fluid supply means, a highly powered actuation mechanism for said fluid control valve operative to exert a force on the valve to close the valve against the pressure action of the fluid supply so that when the valve is closed the pressure of the fluid supply tends to force it open, and automatic valve control means operative to control the actuation mechanism to fully open and fully close the valve alternately during normal steady state operation of the prime mover so as to cause fluid to be supplied to the prime mover intermittently.

2. A fluid driven power supply system according to claim 1, wherein said power producing means comprise an electric alternator connected to be driven by the prime mover, said highly powered actuation mechanism is an electrically controlled hydraulic actuator connected to be energized by hydraulic power supply means, and said automatic valve control means comprise an electrical circuit which controls the hydraulic actuator, said electrical circuit being responsive to a parameter of the electrical power output from the alternator and operative to fully open said valve when this parameter decreases below a first controlled value and to fully close said valve when the parameter increases above a second controlled value, the first controlled value being smaller than the second controlled value, and the magnitude and difference between these values respectively serving to determine the controlled level of the parameter of the power output from the alternator and the frequency of the intermittent on-off operation of the valve.

3. A power supply system according to claim 1, which is driven by hot elastic fluid and wherein said highly powered actuation mechanism is a hydraulically operated actuator connected to hydraulic power supply means, and said fluid control valve and its hydraulic actuator are attached to one another to form a single assembly but have separate bodies which are spaced from one another to prevent undue heat transfer from the valve to the actuator.

4. A fluid driven power supply system according to claim 2, which comprises independent control means for supplying a D.C. control signal, and wherein said electrical circuit operates to control the voltage output from the alternator and comprises rectifier means for rectifying a signal proportional to this voltage and relay means responsive to the difference between said D.C. control signal and the rectified signal supplied by said rectifier means and operative in conjunction with the load on the alternator to govern the frequency of the intermittent valve operation by virtue of its different pick-up and drop-out energization levels.

5. A power supply system according to claim 3, wherein the body of the actuator and the body of the valve are attached to one another by slender rigid support members and the valve closing movement is communicated from the actuator to the valve by a ram which is hydraulically operated by the actuator and has a curved end-face which seats on a valve member of the fluid control valve to provide point contact and a low heat conducting connection.

6. A fluid driven power supply system according to claim 4, wherein said relay has an operating coil energized from the output from said rectifier means in dependence upon an output control from an amplifier which forms part of said circuit and which responds to the difference between said D.C. control signal and the rectified signal supplied by said rectifier means.

7. A fluid driven power supply system comprising fluid supply means, a fluid driven prime mover, power producing means driven by said prime mover, a fluid control valve connected to control the fluid supplied to the prime mover by said fluid supply means, a highly powered actuation mechanism for said fluid control valve operative to exert a force on the valve to close the valve against the pressure action of the fluid supply so that when the valve is closed the pressure of the fluid supply tends to force it open, said actuation mechanism being energized by and in direct proportion to the power produced by said power producing means and comprising part of an automatic valve control means operative to fully open and fully close the valve alternately during normal steady state operation of the prime mover so as to cause fluid to be supplied to the prime mover intermittently.

8. A fluid driven power supply system according to claim 7, comprising, in combination, two fluid driven prime movers controlled by independent hydraulically actuated fluid control valves connected to the said fluid supply means and at least one of the valves being controlled electrically, a hydraulic pump connected and arranged to be driven by one of said prime movers, an electrical alternator connected and arranged to be driven by the other of said prime movers, and said pump and said alternator being connected and arranged respectively to supply the hydraulic power and the electrical power required to actuate and control the valves.

9. A fluid driven power supply system comprising fluid supply means, a fluid driven prime mover, power producing means driven by said prime mover, a pipe connection between said fluid supply means and said prime mover, a fluid control valve connected in said pipe connection intermediate its ends so as to control the fluid supplied to the prime mover by said fluid supply means, a highly powered actuation mechanism for said fluid control valve operative to exert a force on the valve to close the valve against the pressure action of the fluid supply so that when the valve is closed the pressure of the fluid supply tends to force it open, and automatic valve control means operative to control the actuation mechanism to fully open and fully close the valve alternately during normal steady state operation of the prime mover so as to cause fluid to be supplied to the prime mover intermittently.

References Cited in the file of this patent
UNITED STATES PATENTS

| 749,476 | Curtis | Jan. 12, 1904 |
|---|---|---|
| 915,716 | Wilkinson | Mar. 16, 1909 |
| 982,819 | Hodgkinson | Jan. 31, 1911 |
| 1,014,014 | Maximum | Jan. 9, 1912 |
| 2,722,180 | McIlvaine | Nov. 1, 1955 |